(12) United States Patent
Uedo

(10) Patent No.: US 7,359,348 B2
(45) Date of Patent: Apr. 15, 2008

(54) WIRELESS COMMUNICATIONS SYSTEM

(75) Inventor: Kenya Uedo, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1074 days.

(21) Appl. No.: 10/252,383

(22) Filed: Sep. 24, 2002

(65) Prior Publication Data

US 2003/0064681 A1    Apr. 3, 2003

(30) Foreign Application Priority Data

Sep. 28, 2001  (JP)  ............................. 2001-299153
Jul. 2, 2002   (JP)  ............................. 2002-193175

(51) Int. Cl.
  *H04Q 7/00*   (2006.01)
  *H04Q 7/20*   (2006.01)
(52) U.S. Cl. ....................... 370/329; 370/338; 455/450
(58) Field of Classification Search ................ 370/329, 370/336, 337, 338, 347; 455/450
See application file for complete search history.

(56) References Cited

U.S. PATENT DOCUMENTS

| | | | |
|---|---|---|---|
| 6,459,687 B1 * | 10/2002 | Bourlas et al. | 370/328 |
| 6,693,887 B2 * | 2/2004 | Stanwood et al. | 370/338 |
| 6,791,968 B2 * | 9/2004 | Kotzin | 370/348 |
| 6,819,930 B1 * | 11/2004 | Laroia et al. | 455/450 |
| 6,834,193 B1 * | 12/2004 | Linderborg et al. | 455/450 |
| 6,847,629 B2 * | 1/2005 | Razoumov et al. | 370/349 |
| 6,850,540 B1 * | 2/2005 | Peisa et al. | 370/468 |
| 7,006,530 B2 * | 2/2006 | Spinar et al. | 370/468 |
| 7,046,643 B1 * | 5/2006 | Zellner et al. | 370/329 |
| 7,058,040 B2 * | 6/2006 | Schmidt | 370/337 |
| 7,092,727 B1 * | 8/2006 | Li et al. | 455/466 |

* cited by examiner

*Primary Examiner*—Chau Nguyen
*Assistant Examiner*—Marcus Smith
(74) *Attorney, Agent, or Firm*—Wenderoth, Lind & Ponack, L.L.P.

(57) ABSTRACT

A wireless communications system for enabling a base station unit and a plurality of customer premises units to wirelessly communicate data at high efficiency by putting communications on standby for each unit of traffic data for which a communications request occurs, and then shifting to communications processing for each unit of traffic data on communication standby and by managing communication standby information including information that distinguishes customer premises units on communication standby with regard to the customer premises units covered by the base station unit. Based on the communication standby information, data traffic channels are allocated to customer premises units on communication standby covered by the base station unit for each unit of traffic data during communication standby. Wireless communication of data is performed between the base station unit and customer premises units using the portion of the data traffic channels allocated to the customer premises units.

3 Claims, 10 Drawing Sheets

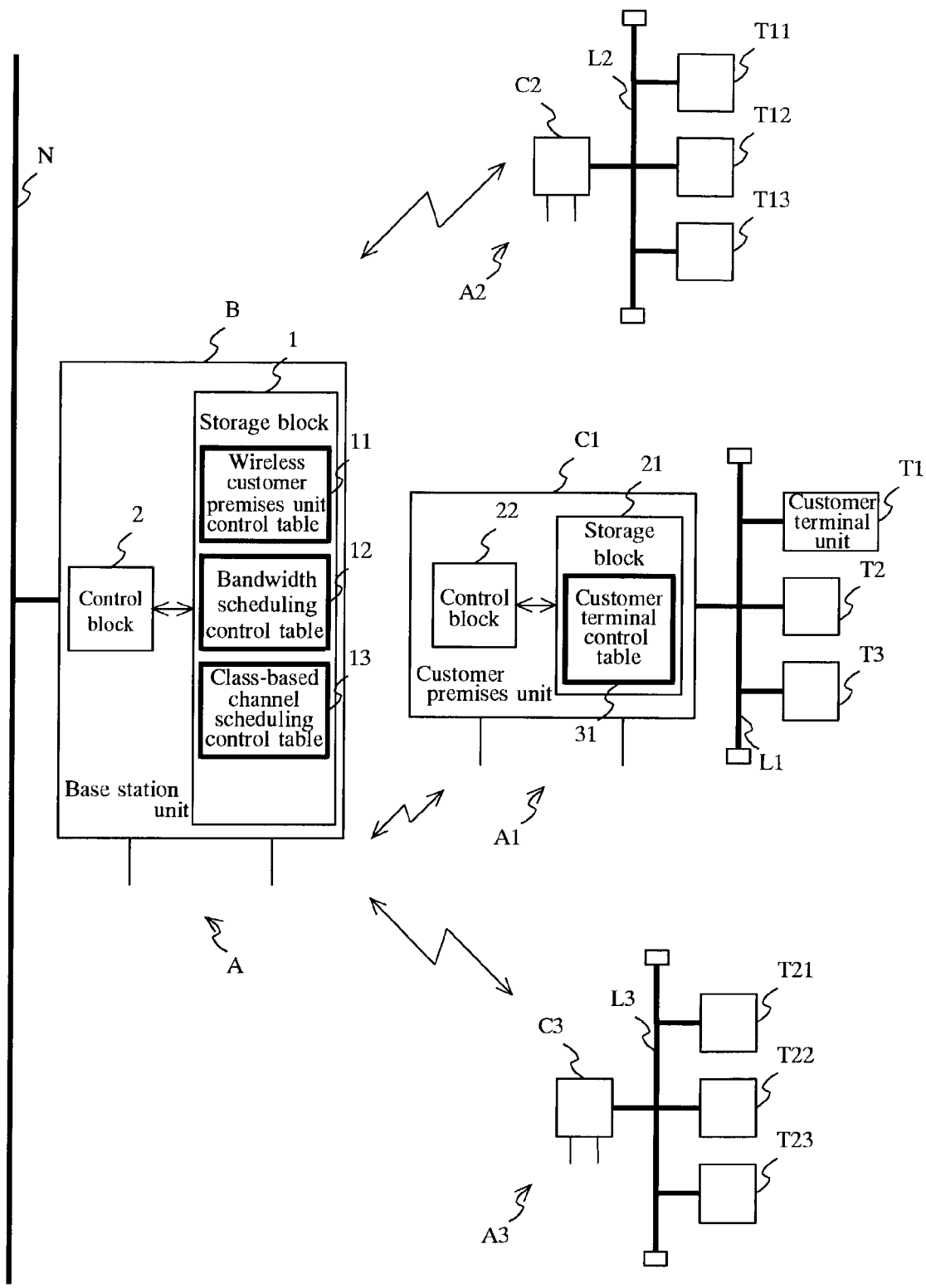
(Fig.1)

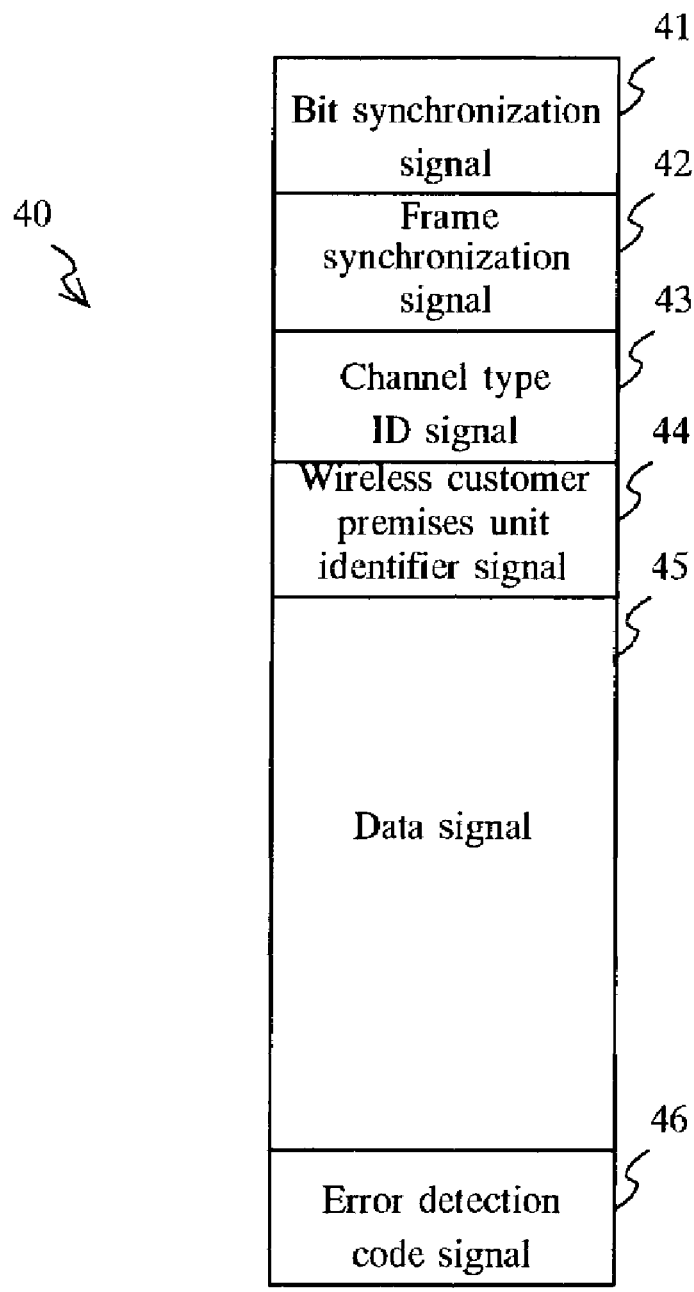
(Fig.2)

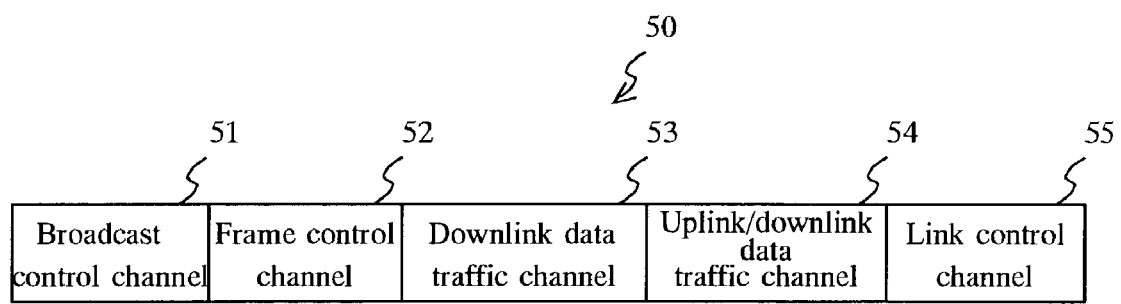
(Fig.3)

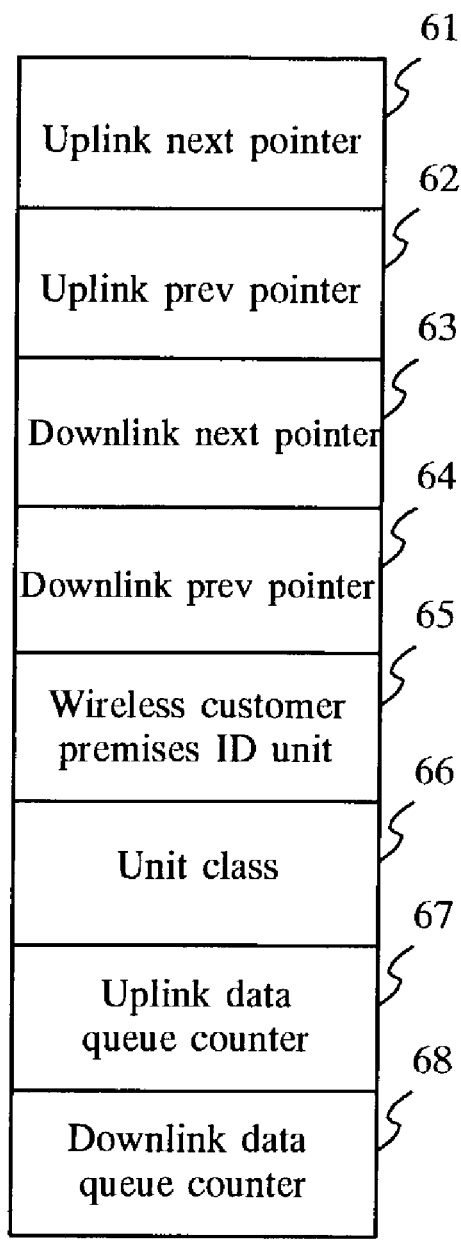
(Fig.4)

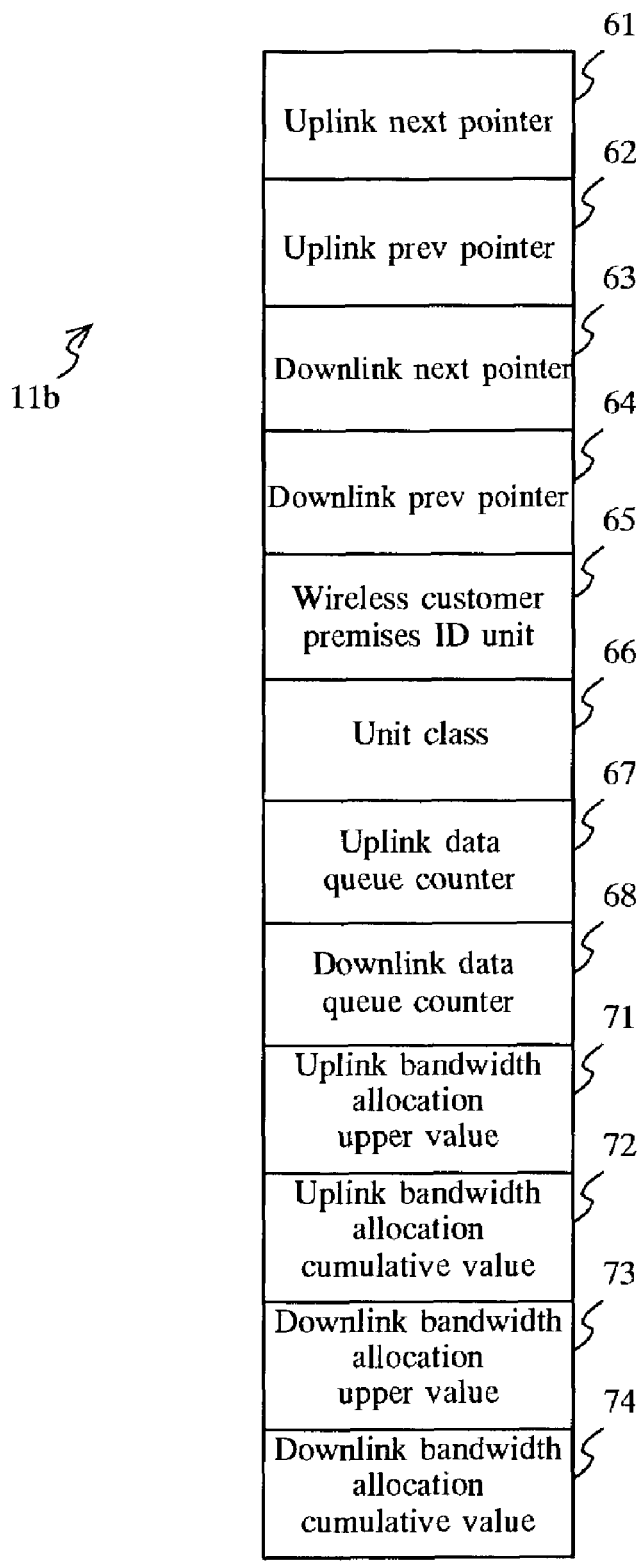
(Fig.5)

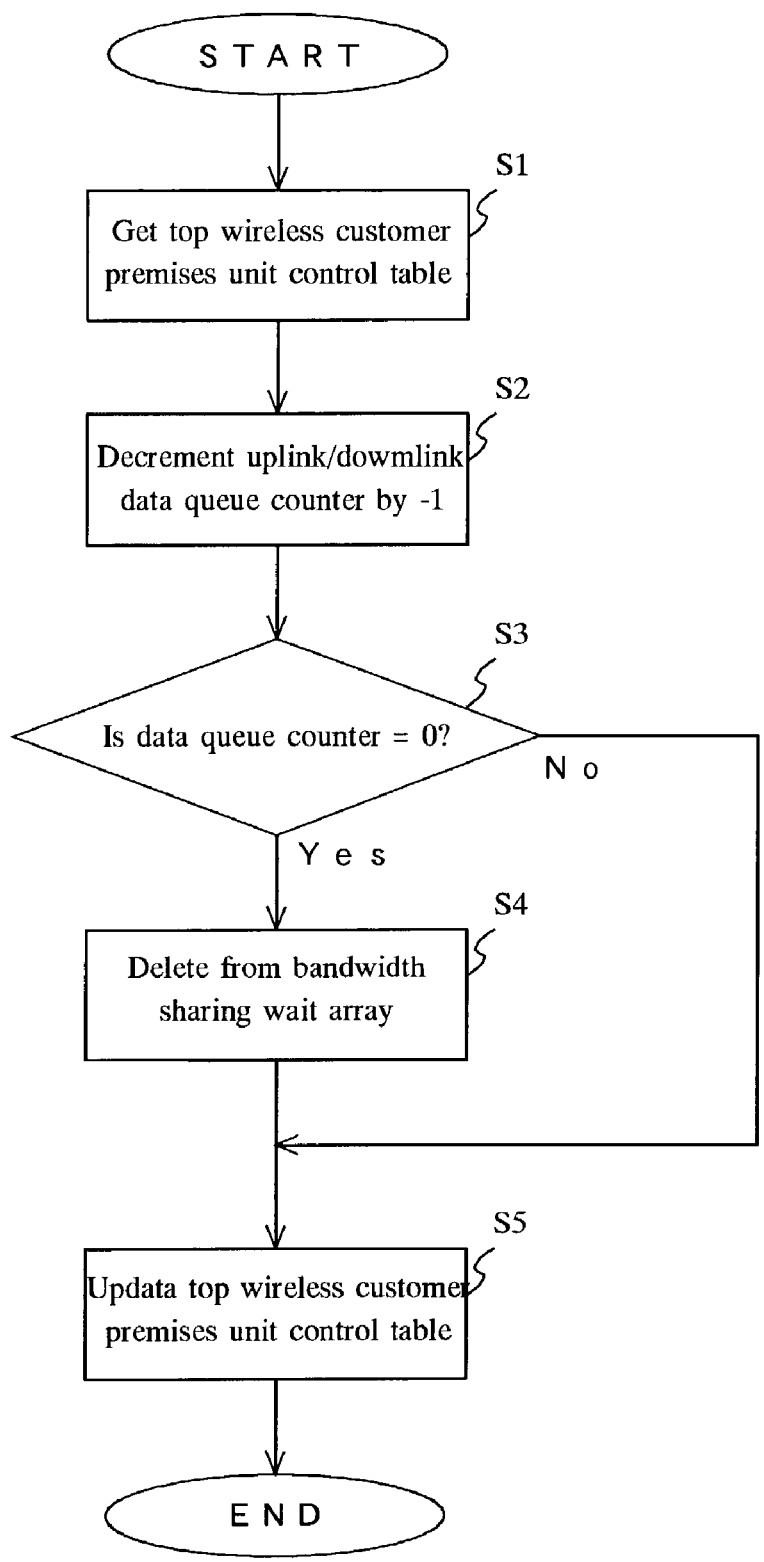
(Fig.6)

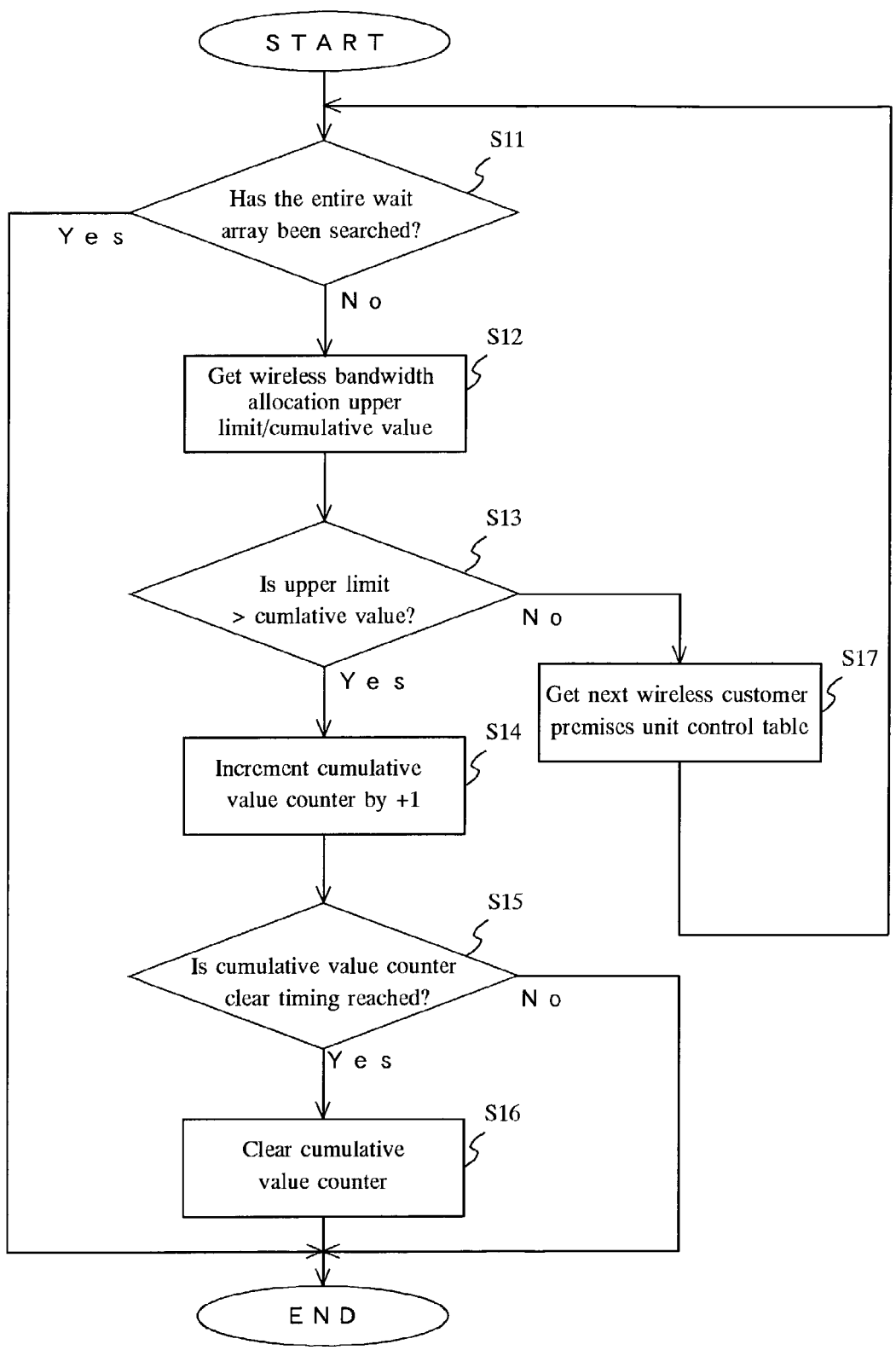
(Fig7)

| Offsets | Allocation candidates |
|---------|----------------------|
| 0 | 1 |
| 1 | 2 |
| 2 | 3 |
| ⋮ | ⋮ |
| n−1 | 1 |

(Fig.8)

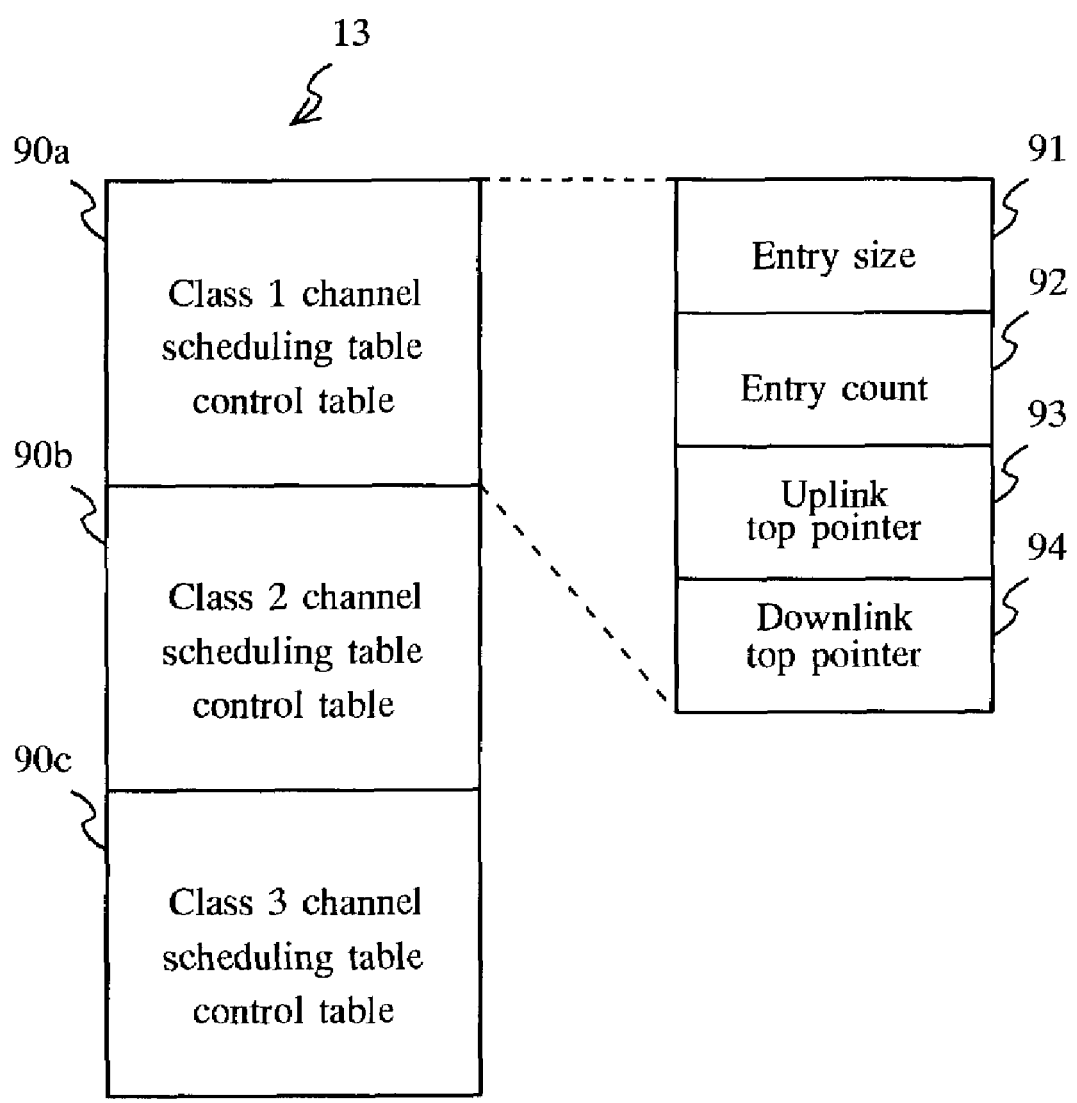
(Fig.9)

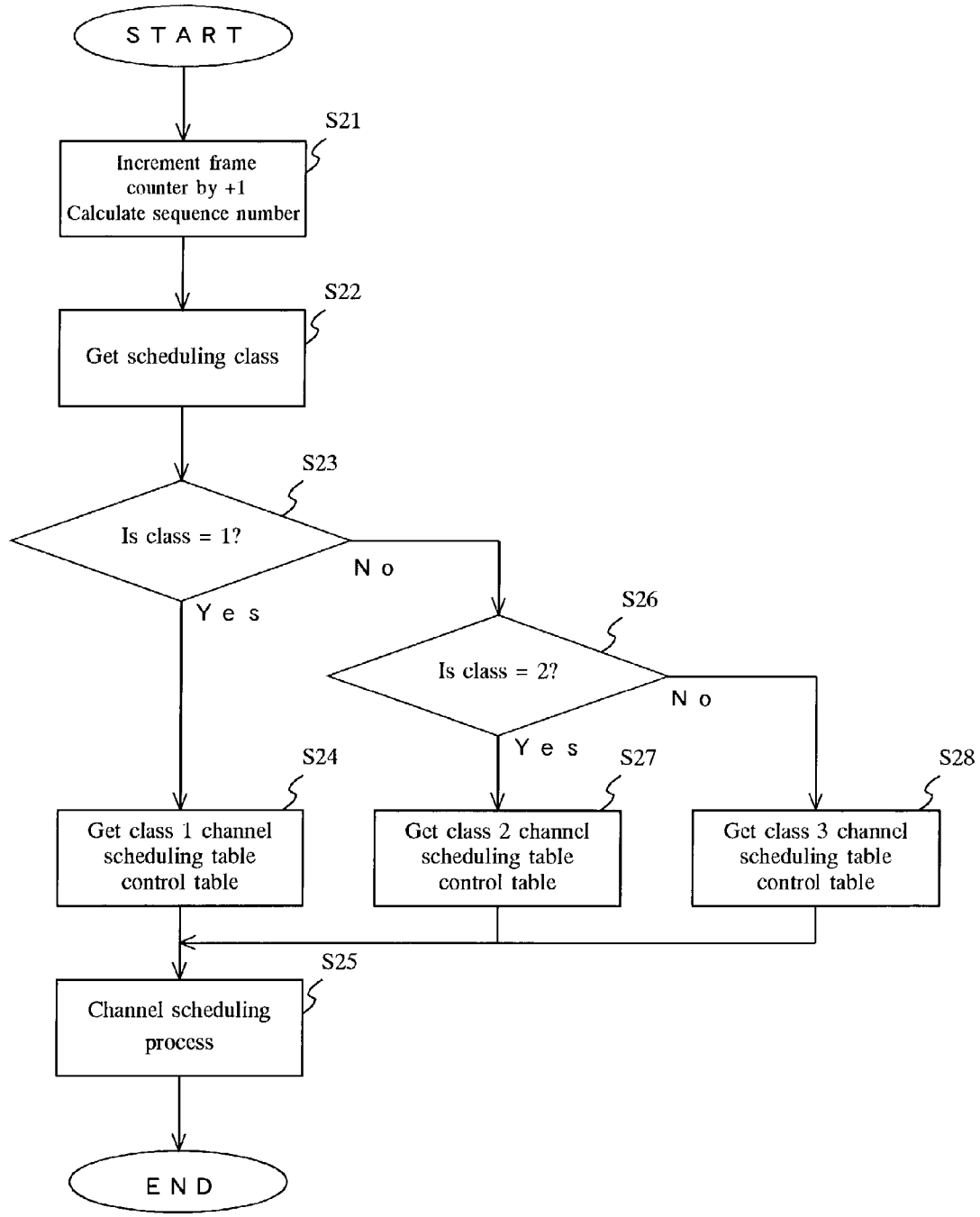
(Fig.10)

WIRELESS COMMUNICATIONS SYSTEM

BACKGROUND OF THE INVENTION

1. Field of the Invention

This invention relates to a subscriber wireless access system or other wireless access system or the like that performs wireless communication between fixed base station equipment and fixed customer premises equipment, and particularly to a wireless communications system technology that improves the efficiency of data transmission by implementing wireless band assurance functions based on flow-rate restrictions (shaping) regarding the allocation of data traffic channels, "best effort" type communications functions based on the shared use of data traffic channels, wireless band assurance functions based on scheduling by class and the like.

2. Description of the Prior Art

In wireless access systems, wireless media are used as the media for transmitting signals subject to communication. Typically, wireless media are allocated to each unit of base station equipment (wireless base station equipment), and are shared by a plurality of units of subscriber premises equipment (wireless subscriber premises equipment) present within the service area monitored by each unit of base station equipment.

In the event that the base station equipment and backbone local area network (LAN) or customer premises equipment and customer terminal equipment are connected by an Ethernet® or IEEE 802.3 wired LAN interface, data that is exchanged via wireless media can be broadly divided into data that has a unique address for sending to each customer terminal unit and data that has an address allocated for sending to a plurality of customer terminal units.

Here, packets used for sending the former data that has a unique address for sending to each customer terminal unit are called unicast packets, while packets used for sending the latter data that has an address for sending to a plurality of customer terminal units are called broadcast packets.

In addition, in the base station equipment, in order to achieve efficient utilization of the wireless bandwidth, it is necessary to include functions for controlling the allocation of data traffic channels. For example, the greater the number of units of customer premises equipment covered within the local service area, the larger the amount of traffic (amount of data transmitted) generated is thought to become, so it is not possible to provide adequate data communication services unless a large amount of exclusive wireless bandwidth is secured. Thus, studies have been done on methods of allocating exclusive wireless bandwidth to each unit of customer premises equipment depending on the number of customer terminal units covered by each unit of customer premises equipment and thereby allocating the data traffic channels.

Here follows a description of an overview of subscriber wireless access systems that have been developed in recent years.

In recent years, subscriber wireless access systems that utilize wireless communication called Wireless Local Loop (WLL) or Fixed Wireless Access (FWA) or the like have been developed and put into practical application. In addition, with the popularity of the Internet, the need for high-speed, large-capacity communication over wireless media has heightened.

In the aforementioned subscriber wireless access systems, base station equipment (BSE) connected to a public circuit network or other backbone network is installed in a fixed location on the top of a building or tower or other high place, while a plurality of units of customer premises equipment (CPE) are also installed in a fixed location on the roof of the customer's building or other high place. The customer premises equipment also includes personal computers (PCs) or other communications terminal units and communications terminal units connected via a local area network (LAN) or the like.

Here, the base station equipment and customer premises equipment may each consist of an outdoor unit (ODU) installed in a fixed location on a building roof or tower or other high place and an indoor unit (IDU) installed in a fixed location within a building or the like, and these are connected with a cable. In addition, the outdoor unit of the base station equipment and customer premises equipment is equipped with a wireless processor that performs the processing of wireless communication using an antenna, mainly controlling the processing of wireless communication.

In addition, in the aforementioned subscriber wireless access systems, wireless communication is performed between the base station equipment and customer premises equipment by means of a time-division multiplexing communications protocol using wireless frames. It is thus possible to connect to and perform data communication among the LANs or the like connected to different customer premises equipment covered by the same base station equipment, and also connect to and perform data communication with LANs or the like connected to other customer premises equipment connected to the backbone network connected to the base station equipment.

However, when the allocation of data traffic channels is performed by a method of allocating exclusive wireless bandwidth to each unit of customer premises equipment as indicated in the aforementioned prior art example, the following problems (1)-(3) were present.

(1) For example, when the allocation of data traffic channels is performed in a fixed manner, as described below, there is a problem in that it cannot handle burst traffic. To wit, where burst traffic may occur depending on fluctuations in the usage of customer terminal units covered by customer premises equipment or the number of customer terminal units covered by customer premises equipment, even if such burst traffic occurs, the wireless bandwidth used by a specific unit of customer premises equipment is exclusive, so there is a problem in that the wireless media which are limited in allocation to base station equipment cannot be used efficiently.

(2) In addition, in the opposite case from (1) above, when wireless media are used as shared bandwidth, there is a problem in that when burst traffic is handled it is not possible to assure the wireless bandwidth for the other customer premises equipment. To wit, when a large amount of wireless bandwidth is allocated to a specific unit of customer premises equipment in response to burst traffic on the LAN, there is a problem in that the wireless bandwidth usable by each unit of customer premises equipment may fluctuate so that it is not possible to assure the minimal wireless bandwidth required for data communication.

(3) In addition, in the conventional allocation of data traffic channels, regarding the customer premises equipment covered by the same base station equipment for example, there is a problem in that a portion of the wireless bandwidth is secured for a specific unit of customer premises equipment while the remaining wireless bandwidth cannot be utilized as shared bandwidth.

The present invention is intended to solve the aforementioned problems and has as its object to provide a wireless communications system that is able to perform the allocation of data traffic channels such as to improve the efficiency of data transmission when base station equipment and a plurality of units of customer premises equipment perform wireless data communication using data traffic channels. Note that the present invention specifically provides a wireless communication system that is able to solve any one or two or more of the aforementioned problems (1) through (3).

SUMMARY OF THE INVENTION

In order to achieve the aforementioned object, the wireless communication system according to the present invention performs the allocation of data traffic channels in the following manner when base station equipment and a plurality of units of customer premises equipment perform wireless data communication using data traffic channels.

The data traffic channels that can be allocated to each unit of customer premises equipment are limited and then the allocation of data traffic channels to customer premises equipment is performed, and then the base station equipment and customer premises equipment perform wireless communication of data using the portion of the data traffic channels allocated to the customer premises equipment in question.

Accordingly, since the data traffic channels that can be allocated to each unit of customer premises equipment are limited and then the allocation of data traffic channels to customer premises equipment is performed, it is possible to discriminate among the customer premises equipment with respect to the wireless bandwidth to be assured, for example, and the allocation of data traffic channels dynamically depending on the communication situation and the like can be performed while limiting the allocation of data traffic channels to each unit of customer premises equipment, for example. Thus, it is possible to improve the efficiency of data communications.

Between the base station equipment and customer premises equipment, it is possible to perform either uplink communication from the customer premises equipment to the base station equipment or downlink communication from the base station equipment to the customer premises equipment, or both may be performed. The present invention is applicable to either one of uplink communication or downlink communication, or it is applicable to both.

In addition, various modes may be used as the mode of limiting the data traffic channels that can be allocated to each unit of customer premises equipment; for example, a mode of limiting the number of units of traffic data that can be allocated, a mode of limiting the number of slots that can be allocated, a mode of limiting the amount of data communications that can be allocated, a mode of limiting the time bands that can be allocated, or a mode of limiting the types of data traffic channels that can be allocated when there is a plurality of types of data traffic channels may be used.

As a sample configuration, with the wireless communications system according to the present invention, the upper limit on the quantity of data traffic channels that can be allocated to each unit of customer premises equipment is set, and the quantity of data traffic channels allocated to each unit of customer premises equipment is limited to the upper limit or less, or less than the upper limit set for that unit of customer premises equipment in question. Note that the word "quantity" may also include a "number."

Here, the upper limit for the quantity of data traffic channels that can be allocated may be, for example, an upper limit for the number of units of traffic data that can be allocated, an upper limit for the number of slots that can be allocated, an upper limit to the amount of data communications that can be allocated.

In addition, various values can be used as the upper limit.

In addition, the mode of limiting the quantity of data traffic channels allocated to the upper limit or less, or less than the upper limit may be, for example, a mode of limiting to the upper limit or less or a mode of limiting to less than the upper limit.

Here follows a description of another sample configuration of the wireless communications system according to the present invention.

With the wireless communications system according to the present invention, as a sample configuration, data communication between base station equipment and customer premises equipment is performed by putting communications on standby for each unit of traffic data for which a communications request occurs, and then shifting to communications processing for each unit of traffic data on communication standby. In addition, an upper limit on the number of said units of traffic data that can be communicated is set for each unit of customer premises equipment. In addition, regarding the customer premises equipment covered by base station equipment, communication standby information is managed, including information that identifies the customer premises equipment subject to communication standby. Moreover, based on this communication standby information, the number of units of said traffic data that can be communicated to each unit of customer premises equipment is limited to the upper limit number or less, or less than the upper limit number set for the unit of customer premises equipment in question, and then the allocation of data traffic channels to the customer premises equipment subject to communication standby covered by the base station equipment is performed for each unit of traffic data on communication standby.

Here, the upper limit on the number of said units of traffic data that can be communicated may be, for example, an upper limit regarding the cumulative number of units of traffic data that can be communicated, an upper limit number regarding the number of units of traffic data that can be communicated within a stipulated period of time, an upper limit number regarding the number of units of traffic data that can be communicated simultaneously, or the like.

In addition, various values can be used as the upper limit number.

In addition, the mode of limiting the number of units of traffic data that can be communicated to the upper limit number or less, or less than the upper limit number may be, for example, a mode of limiting to the upper limit number or less or a mode of limiting to less than the upper limit number.

As a sample configuration, in the wireless communications system according to the present invention, the number of units of said traffic data that can be communicated to each unit of customer premises equipment is counted, and this count is compared against the upper limit number set for each unit of customer premises equipment, and based on the results of this comparison, a determination is made as to whether or not communication of said unit of traffic data to said unit of customer premises equipment is possible. In addition, the count for each unit of customer premises equipment is set to zero at stipulated time intervals.

Here, the method of determining whether or not communication of a unit of traffic data to a unit of customer premises equipment is possible based on the results of the comparison of the count of the number of units of said traffic data that can be communicated to each unit of customer premises equipment against the upper limit number set for each unit of customer premises equipment, for example, may be as follows: if the count is (upper limit number−1) or less or less than (upper limit number−1) then a determination is made that one more unit of traffic data can be communicated, but if the count is greater than (upper limit number−1) or (upper limit number−1) or greater then a determination is made that no more units of traffic data can be communicated in that state.

In addition, setting the count to zero for each unit of customer premises equipment is equivalent to initializing the count to zero, for example.

In addition, various time intervals and timings may be used as the stipulated time interval and timing for setting the count to zero for each unit of customer premises equipment, for example, a different time interval and different timing may be used for each unit of customer premises equipment, or the same time interval and same timing may be used for a plurality of units of customer premises equipment.

In addition, with the wireless communications system according to the present invention, as a sample configuration, a plurality of classes for categorizing customer premises equipment is provided, data traffic channels are allocated for each class, and the data traffic channels are allocated in each class to customer premises equipment categorized into the various classes within the allocated portion of data traffic channels for each class.

In this configuration, for each class, it is possible to limit the data traffic channels that can be allocated to the customer premises equipment categorized into each class, and for example, it is possible to achieve the assurance of wireless bandwidth for each class and the assurance of wireless bandwidth for each unit of customer premises equipment.

In addition, the present invention also provides the base station equipment as described above.

With the base station equipment according to the present invention, when performing communication with a plurality of units of customer premises equipment using data traffic channels, the data traffic channels are allocated as follows.

To wit, a data traffic channel allocation means limits the data traffic channels that can be allocated to each customer premises equipment covered by the base station equipment in question and performs the allocation of data traffic channels to customer premises equipment, and a data wireless communication means uses the customer premises equipment and the portions of the data traffic channels allocated to the customer premises equipment in question to perform the wireless communication of data.

In addition, with the base station equipment according to the present invention, as a sample configuration, the upper limit of the quantity of data traffic channels that can be allocated is set for each unit of customer premises equipment covered by the base station equipment in question, and the data communication channel allocation means limits the quantity of data traffic channels allocated to each unit of customer premises equipment to the upper limit or less, or less than the upper limit set for each of the units of customer premises equipment in question.

In addition, with the base station equipment according to the present invention, as a sample configuration, data communication with the customer premises equipment is performed by putting communications on standby for each unit of traffic data for which a communications request occurs, and then shifting to communications processing for each unit of traffic data on communication standby. In addition, an upper limit on the number of said units of traffic data that can be communicated is set for each unit of customer premises equipment. In addition, regarding the customer premises equipment covered by the base station equipment in question, a communication standby information management means manages communication standby information, including information that identifies the customer premises equipment subject to communication standby. Moreover, based on this communication standby information, a data traffic channel allocation means limits the number of units of said traffic data that can be communicated to each unit of customer premises equipment to the upper limit number or less, or less than the upper limit number set for the unit of customer premises equipment in question, and then performs the allocation of data traffic channels to the customer premises equipment subject to communication standby covered by the base station equipment for each unit of traffic data on communication standby.

In addition, with the base station equipment according to the present invention, as a sample configuration, the data traffic channel allocation means counts the number of units of said traffic data that can be communicated to each unit of customer premises equipment, compares this count against the upper limit number set for each unit of customer premises equipment, and based on the results of this comparison, makes a determination as to whether or not communication of said unit of traffic data to said unit of customer premises equipment is possible. In addition, the count for each unit of customer premises equipment is set to zero at stipulated time intervals.

In addition, with the base station equipment according to the present invention, as a sample configuration, a plurality of classes for categorizing customer premises equipment is provided and data traffic channels are allocated for each class. The data traffic channel allocation means allocates the data traffic channels in each class to customer premises equipment categorized into the various classes within the allocated portion of data traffic channels for each class.

Moreover, here follows a description of other configurations of the wireless communications system according to the present invention, including the aforementioned configuration.

Note that the following configurations can be applied to the aforementioned wireless communications system according to the present invention.

In addition, the following configurations contribute to achieving the aforementioned object of the present invention.

With the wireless communications system according to the present invention, when a base station unit and a plurality of customer premises units covered by said base station unit communicate data wirelessly using data traffic channels, the allocation of data traffic channels is performed as follows.

To wit, data communication between the base station unit and customer premises units is performed by putting communications on standby for each unit of traffic data for which a communications request occurs, and then shifting to communications processing for each unit of traffic data on communication standby. Also, communication standby information including information that distinguishes customer premises units on communication standby with regard to the customer premises units covered by the base station unit is managed. And based on said communication standby information, the allocation of data traffic channels to customer premises units on communication standby covered by the base station unit for each of said unit of traffic data during communication standby. Furthermore, the wireless communication of data between the base station unit and customer premises units is performed using the portion of the data traffic channels allocated to said customer premises units.

Accordingly, in the configuration wherein communication is put on standby for every unit of traffic data during communication standby and the shift to communication processing is performed, the allocation of data traffic channels to the customer premises units on communication standby is performed on each unit of traffic data during communication standby, so even if LAN burst traffic should occur, for example, the wireless media allocated to base station equipment can be used efficiently and thus the efficiency of communication of data can be improved.

Here, various numbers may be used as the number of the customer premises units covered by the base station unit.

In addition, between the base station equipment and customer premises equipment, it is possible to perform either uplink communication from the customer premises equipment to the base station equipment or downlink communication from the base station equipment to the customer premises equipment, or both may be performed. The present invention is applicable to either one of uplink communication or downlink communication, or it is applicable to both.

In addition, various quantities of data can be used as the unit of traffic data, and this need not necessarily be a fixed quantity of data, but rather a variable quantity of data may also be used. As one example, when communicating data in each packet, the data communicated in each packet may be used as the unit of traffic data, or the amount of data that can be communicated in one packet can be used as the quantity of data in this unit of traffic data, or the amount of data in question may vary within a range below the maximum amount of data that can be communicated in one packet depending on the communication situation, for example.

In addition, the unit of traffic data in which the communication request occurred may be, for example, the unit of traffic data in which the communication request occurred on the customer premises unit side in uplink communication, or it may be, for example, the unit of traffic data in which the communication request occurred on the customer premises unit side in downlink communication. Moreover, the standby of communication is started when the communication request occurs in each unit of data traffic, and the shift to communication processing occurs when the order of communication processing comes.

In addition, the communication standby information may consist of only information that distinguishes the customer premises unit on communication standby, for example, or it may also include other information.

In addition, various types of information may be used as the information that distinguishes the customer premises unit on communication standby. For example, information that directly indicates whether or not the customer premises units are on communication standby, or information that indirectly indicates whether or not it is on communication standby such as information on the number of units or quantity of data pertaining to communications waiting regarding the customer premises units may be used.

In addition, the communication standby information may be managed individually for each of the customer premises units covered by the base station unit, or it may be managed together for all of the customer premises units covered by the base station unit together.

In addition, various methods may be used as the method of allocating data traffic channels for the customer premises units. For example, a method of allocating data traffic channels for customer premises units for each time band, a method of allocating data traffic channels for customer premises units for each slot in the case in which data communication is performed using slots, or a method of allocating data traffic channels for customer premises units for each frequency in the case in which data communication is performed using a plurality of frequencies may be used. In these methods, the time bands in which the data traffic channel allocated to the customer premises units are usable, the slots in which the data traffic channel allocated to the customer premises units are usable, or the frequencies in which the data traffic channel allocated to the customer premises units are usable are equivalent to the portion of the data traffic channel allocated to the customer premises units.

In addition, with the wireless communications system according to the present invention, in the aforementioned configuration, wireless communication between the base station unit and customer premises units covered by said base station unit is performed by means of a plurality of sequentially communicated frames, and each frame constitutes a data traffic channel and contains data communication slots used for communication of the units of said traffic data. Said communication standby information contains information indicating the number of units of said traffic data on communication standby in the customer premises units on communication standby. In addition, as the allocation of said data traffic channels, each time one unit of said traffic data on communication standby is moved to the communication process, the customer premises units on communication standby covered by the base station unit are switched one at a time in a periodic sequence, and a data communications slot contained in the first frame in which the data communications slot is not yet allocated (namely, the data communications slot is still not allocated) is allocated to the switched customer premises unit. Moreover, the wireless communication of data between the base station unit and customer premises units is performed using the data communication slot allocated to said customer premises units.

Accordingly, in the configuration wherein data communication is performed using data traffic slots contained in the sequentially communicated frames, unallocated data traffic slots are allocated by switching the customer premises unit one at a time in a periodic sequence each time one unit of traffic data on communication standby is shifted to the communications process, so even in the event that burst traffic occurs, the data traffic channels (here, data traffic slots) can be allocated uniformly to the customer premises units on communication standby, thereby improving the efficiency of data communication.

Here, frames of various constitutions may be used, but normally the frames contain data traffic slots constituting a data traffic channel as well as control slots constituting a channel for communicating control information.

Various quantities of data may be used as the size of the data traffic slot, or namely the quantity of data that can be communicated in one data traffic slot. In addition, the number of data traffic slots contained in one frame may be one or two or more. In addition, one frame may contain a plurality of data traffic slots of different sizes.

In addition, the information on the number of units of traffic data on communication standby in the customer premises units on communication standby may be, for example, information indicating a number that indicates how many units of traffic data are present on communication standby in the customer premises units covered by the base station unit.

In addition, the method of switching the customer premises unit on communication standby covered by the base station unit one at a time in a periodic sequence may be, for example, arranging the customer premises units on communication standby in a stipulated order and switching from the top to the bottom, and then switching again to return to the top and repeating. In addition, during this switching, the customer premises units wherein units of traffic data on communication standby are no longer present are excluded from being subject to switching. On the other hand, customer premises units in which a new communications request occurs and units of traffic data on communication standby are generated are added anew to those subject to switching.

In addition, the first frame in which the data traffic slot is unallocated may be, for example, equivalent to a frame in which the data traffic slot is still not allocated to any of the customer premises units and which is to be communicated in the nearest future among the frames to be communicated sequentially.

With the wireless communications system according to the present invention, when a base station unit and a plurality of customer premises units covered by said base station unit communicate data wirelessly using data traffic channels, the allocation of data traffic channels is performed as follows.

To wit, a plurality of classes that categorize the customer premises units is provided, data traffic channels are allocated to each class, and for every class, the allocation of data traffic channels to customer premises units categorized by class is performed within the portion of data traffic channels allocated to each class. Moreover, the wireless communication of data between the base station unit and customer premises units is performed using the portion of data traffic channels allocated to said customer premises units.

Accordingly, the allocation of data traffic channels to customer premises units categorized into classes within the range of the portion of the data traffic channels allocated to each of the classes is performed, so even in the case of handling burst traffic in each class, for example, this will not affect the allocation of data traffic channels in other classes, so it is possible to assure a minimal level of wireless bandwidth required for data communication in other classes, and thus it is possible to improve the efficiency of data communication.

Here, various classes may be used as the classes for categorizing customer premises units; for example, classes may be used so that customer premises units belonging to the same company or the same organization are categorized in the same class.

In addition, various numbers may be used as the number of the plurality of classes.

In addition, the method of allocating data traffic channels to the various classes may be, for example, a method of allocating data traffic channels such that the maximum quantity of data that can be communicated in each class becomes identical, or a method of allocating the data traffic channels such that the maximum quantity of data that can be communicated in each class becomes different, thereby differentiating the classes.

In addition, the number of customer premises units categorized in each class may be one or two or more. In addition, the number of customer premises units categorized in each class may be set in a fixed manner or it may be set in a variable manner. Note that a plurality of customer premises units is normally categorized within one or more of the classes within a plurality of classes.

In addition, for a class in which only one customer premises unit is categorized, for example, the portion of the data traffic channel allocated to the class in question can be assumed to be the portion of the data traffic channel allocated to that one customer premises unit.

In addition, with the wireless communications system according to the present invention, in the aforementioned configuration, the maximum number of customer premises units that can be categorized in each class is set, and a number of customer premises units equal to or less than the maximum number of customer premises units that can be categorized is categorized in each class, respectively.

Accordingly, since the maximum number of customer premises units that can be categorized in each class is set, it is possible to assure a sufficient portion of the data traffic channels allocated to the customer premises units categorized in each class for every class, and thus it is possible to increase the efficiency of data communication.

Here, the maximum number of customer premises units that can be categorized in each class may be set to one, for example, or the number may be set to two or more. In addition, In addition, the maximum number of customer premises units that can be categorized in each class may be set in a fixed manner or it may be set in a variable manner.

In addition, with the wireless communications system according to the present invention, in the aforementioned configuration, both classes in which only one customer premises unit is categorized and classes in which a plurality of customer premises units is categorized are present.

Accordingly, since in classes in which only one customer premises unit is categorized the portion of the data traffic channel allocated to said class is used exclusively by that one customer premises unit, but in classes in which two or more customer premises units are categorized the portion of the data traffic channel allocated to said class is shared by those two or more customer premises units, by using both classes in which only one customer premises unit is categorized and classes in which two or more customer premises units are categorized, regarding the customer premises units covered by the same base station unit, for example, it is possible to assure an exclusive bandwidth for a portion of the wireless bandwidth for a specific customer premises unit while also using the remaining wireless bandwidth for a plurality of customer premises units.

In addition, the present invention also provides a base station unit as described above.

With the base station unit according to the present invention, when a base station unit communicates wirelessly with a plurality of customer premises units using data traffic channels, data communication with the customer premises units is performed by putting communications on standby for each unit of traffic data for which a communications request occurs, and then shifting to communications processing for each unit of traffic data on communication standby, thereby allocating data traffic channels as follows.

To wit, in said base station equipment, information that distinguishes customer premises units on communication standby regarding customer premises units covered by said base station unit is managed, data traffic channels are allocated to customer premises units on communication standby covered by said base station unit for each unit of traffic data during communication standby based on said communication standby information, and the wireless communication of data is performed with the customer premises units using the portions of the data traffic channels allocated to said customer premises units.

In addition, with the base station unit according to the present invention, in the aforementioned configuration, wireless communication between the base station unit and customer premises units covered by said base station unit is performed by means of a plurality of sequentially communicated frames, each frame constitutes a data traffic channel and contains data communication slots used for communication of the units of said traffic data, said communication standby information contains information indicating the number of units of said traffic data on communication standby in the customer premises units on communication standby, the data traffic channel allocation means of said base station unit performs a process whereby, as the allocation of said data traffic channels, each time one unit of said traffic data on communication standby is moved to the communication process, the customer premises units on communication standby covered by the base station unit are switched one at a time in a periodic sequence, and a data communications slot contained in the first frame in which the data communications slot is not yet allocated is allocated to the switched customer premises unit, and the data wireless communication means of said base station unit performs the wireless communication of data between the base station unit and customer premises units using the data communication slot allocated to said customer premises units.

In addition, with the base station unit according to the present invention, when communicating data wirelessly with a plurality of customer premises units using data traffic channels, a plurality of classes that categorize the customer premises units is provided and data traffic channels are allocated to each class, and data traffic channels are allocated to customer premises units as follows.

To wit, in said base station unit, data traffic channel allocation means performs, for every class, the allocation of data traffic channels to customer premises units categorized by class within the portion of data traffic channels allocated to each class, and data wireless communication means performs the wireless communication of data with the customer premises units using the portion of data traffic channels allocated to said customer premises units.

In addition, with the base station unit according to the present invention, in the aforementioned configuration, the maximum number of customer premises units that can be categorized in each class is set, and a number of customer premises units equal to or less than the maximum number of customer premises units that can be categorized in each class, respectively.

In addition, with the base station unit according to the present invention, in the aforementioned configuration, both classes in which only one customer premises unit is categorized and classes in which a plurality of customer premises units is categorized are present.

BRIEF EXPLANATION OF THE DRAWINGS

FIG. 1 is a diagram of an example of the constitution of a wireless access system according to a preferred embodiment of the present invention.

FIG. 2 is a diagram of an example of the format of a data traffic channel used in data communication between base station equipment and customer premises equipment.

FIG. 3 is a diagram of an example of the format of the wireless frame used for wireless circuit control between base station equipment and customer premises equipment.

FIG. 4 is a diagram of an example of the format of a wireless customer premises unit control table stored in base station equipment.

FIG. 5 is a diagram of another example of the format of a wireless customer premises unit control table stored in base station equipment.

FIG. 6 is a flowchart of an example of the procedure for controlling the bandwidth sharing wait array performed by the control block of the base station unit.

FIG. 7 is a flowchart of an example of the procedure for limiting the flow of wireless bandwidth of data traffic channels for each customer premises unit performed by the control block of the base station unit.

FIG. 8 is a diagram of an example of the format of a bandwidth scheduling control table stored in base station equipment.

FIG. 9 is a diagram of an example of the format of a class-based channel scheduling control table stored in base station equipment.

FIG. 10 is a flowchart of an example of the procedure for scheduling the bandwidth allocation of data traffic channels by class performed by the control block of the base station unit.

DESCRIPTION OF THE PREFERRED EMBODIMENTS

Here follows a description of preferred embodiments of the present invention made with reference to the figures.

We shall first describe Preferred Embodiment 1 of the present invention.

FIG. 1 shows one example of a wireless access system to which the present invention is applied. Specifically, a base station unit B, backbone network N consisting of a LAN or the like connected to said base station unit B, a plurality of customer premises units C1-C3 covered by said base station unit B, Ethernet® or LAN or other lines L1-L3 connected to each of the customer premises units C1-C3, and a plurality of customer terminal units T1-T3, T11-T13 and T21-T23 connected via the customer premises units C1-C3 and lines L1-L3 are illustrated. In addition, the figure also shows an antenna A provided on the base station unit B and antennas A1-A3 provided on the customer premises units C1-C3.

Note that in this example, for convenience in explanation, only one base station unit B is shown, but typically a plurality of base station units are provided and these base station units are connected via the backbone network N such that they are able to communicate.

In addition, various numbers may be used as the number of the customer premises units C1-C3 and the number of customer terminal units T1-T3, T11-T13 and T21-T23.

As shown in the figure, the base station unit B is provided with a storage block 1 consisting of memory and the like, and a control block 2 consisting of a central processor unit (CPU) and the like. In addition, the storage block 1 stores a wireless customer premises unit control table 11 that manages information regarding the customer premises units C1-C3 covered by the local station (the base station unit B in question), a bandwidth scheduling control table 12 that manages the scheduling of the wireless bandwidth regarding a plurality of classes and a class-based channel scheduling control table 13 that manages the scheduling of data traffic channels by class. Note that the bandwidth scheduling control table 12 and class-based channel scheduling control table 13 are to be described in detail in Preferred Embodiment 2 of the present invention, as described later.

In addition, the customer premises units C1-C3 have functions for exchanging data wirelessly with the base station unit B and also function as bridges for filtering and forwarding data from the customer terminal units T1-T3, T11-T13 and T21-T23 connected via an Ethernet® interface, for example.

As shown in the figure, each of the customer premises units C1-C3 is provided with a storage block 21 consisting of memory and the like, and a control block 22 consisting of a CPU and the like. In addition, the storage block 21 stores a customer terminal control table 31 that manages information regarding the customer terminal units T1-T3, T11-T13 and T21-T23 connected to the local station (the customer premises units C1-C3 in question). The customer terminal control table 31 stores and manages ID information and the like for the customer terminal units T1-T3, T11-T13 and T21-T23 connected to the local station.

FIG. 2 shows one example of the format of the data traffic channel 40 which is a wireless channel used for exchanging data between the base station unit B and the customer premises units C1-C3. As shown in this figure, the data traffic channel 40 in this example consists of, starting from the beginning: a bit synchronization signal 41 which is a signal for establishing bit synchronization, a frame synchronization signal 42 which is a signal for establishing frame synchronization, a channel type ID signal 43 which is a signal that identifies the type of channel (e.g., data channel, control channel or other types), a wireless customer premises unit identifier signal 44 which is a signal that specifies the destination customer premises units C1-C3, a data signal 45 which is a signal containing data, and an error detection code signal 46 which is a signal containing codes for performing error detection.

Here, the data signal 45 contains, for example, Ethernet® packets sent from the customer terminal units T1-T3, T11-T13 and T21-T23 on the side of the customer premises units C1-C3, or Ethernet® packets sent from the backbone network N on the side of the base station unit B.

Note that when data with addresses allocated to a plurality of customer terminal units T1-T3, T11-T13 and T21-T23 is to be sent from the base station unit B by means of broadcast packets, a default value of "0xFFFF (h: hexadecimal)" or the like is set in the wireless customer premises unit identifier signal 44. On the other hand, when data addressed individually to one of the customer terminal units T1-T3, T11-T13 and T21-T23 is sent from base station unit B by means of unicast packets, the value of the identifier of the customer premises unit C1-C3 that covers the destination customer terminal unit T1-T3, T11-T13 or T21-T23 is set in the wireless customer premises unit identifier signal 44. In this example, these settings can be used to determine the value of the identifier stored in the wireless customer premises unit identifier signal 44 in the customer premises units C1-C3 on the receiving side of the data traffic channel and thus control the receiving operation by an indeterminate plurality of customer premises units C1-C3 or a specific customer premises unit C1-C3.

FIG. 3 shows an example of the format of a wireless frame 50 used for wireless circuit control performed between the base station unit B and customer premises units C1-C3. As shown in this figure, the wireless frame 50 in this example consists of, starting from the beginning: a broadcast control channel 51 which is a channel that performs broadcast control, a frame control channel 52 which is a channel that performs frame control, a downlink data traffic channel 53 which is a channel for communicating downlink traffic data from the base station unit B to the customer premises units C1-C3, an uplink/downlink data traffic channel 54 which is a channel for communicating uplink data from the customer premises units C1-C3 to the base station unit B or the aforementioned downlink data, and a link control channel 55 which is a channel that performs link control.

Over the entire area of the wireless cell (service area) from the base station unit B, the broadcast control channel 51 is used to report the synchronization establishment timing of the wireless frame 50, report the value of the frame counter which is the serial number of the wireless frame 50, report the identifier of the local station (the base station unit B in question) and report bandwidth allocation information that indicates whether or not the data traffic channel 54 can be used by each of the customer premises units C1-C3 in the wireless frame 50 containing the broadcast control channel 51 in question.

The frame control channel 52 is used to report bandwidth allocation information for the link control channel 55 from the base station unit B to the customer premises units C1-C3, and to report information containing the results of authentication of the customer premises units C1-C3 and customer premises units C1-C3 by the local station (the base station unit B in question).

The downlink data traffic channel 53 is used to communicate data with Ethernet® packets from the base station unit B to the customer premises units C1-C3.

The uplink/downlink data traffic channel 54 is used to communicate data with Ethernet® packets from the customer premises units C1-C3 to the base station unit B, or communicate data with Ethernet® packets from the base station unit B to the customer premises units C1-C3.

The link control channel 55 is used for reporting, from the customer premises units C1-C3 to the base station unit B, information for wireless bandwidth allocation requests for using the uplink/downlink data traffic channel 54 for communication of uplink traffic data, and authentication requests of the local station (the customer premises units C1-C3 in question).

In this example, by sequentially communicating wireless frames 50 that have this configuration, wireless circuit control between the base station unit B and customer premises units C1-C3 is performed by means of the Time Division Multiple Access/Time Division Duplex (TDMA/TDD) protocol.

Next, in reference to FIG. 4 and FIG. 5, two examples of the wireless customer premises unit control table 11 stored in the storage block 1 of base station unit B are presented.

In this example, a wireless customer premises unit control table 11 is provided in each of the customer premises units C1-C3.

FIG. 4 shows one example of the format of the wireless customer premises unit control table 11a stored in storage block 1 of base station unit B.

In the example shown in the figure, the wireless customer premises unit control table 11a corresponding to the customer premises units C1-C3 consists of, starting from the beginning: a pointer to the next wireless customer premises unit control table related to the uplink traffic data (uplink next pointer) 61, a pointer to the previous wireless customer premises unit control table related to the uplink traffic data (uplink prev pointer) 62, a pointer to the next wireless customer premises unit control table related to the downlink traffic data (downlink next pointer) 63, a pointer to the previous wireless customer premises unit control table related to the downlink traffic data (downlink prev pointer) 64, wireless customer premises unit ID 65, unit class 66, uplink data queue counter 67 and downlink data queue counter 68.

Here, when a plurality of customer premises units C1-C3 have uplink traffic data on communication standby subject to sending, the base station unit B uses the uplink next pointer 61 and uplink prev pointer 62 to create an array consisting of a bidirectional list of wireless customer premises unit control tables. Specifically, regarding uplink traffic data, for the wireless customer premises unit control tables provided for a certain customer premises unit, the uplink next pointer 61 indicates the wireless customer premises unit control table corresponding to the customer premises unit next in order, while the uplink prev pointer 62 indicates the wireless customer premises unit control table corresponding to the customer premises unit previous in order.

Similarly, when a plurality of customer premises units C1-C3 have downlink traffic data on communication standby subject to receiving, the base station unit B uses the downlink next pointer 63 and downlink prev pointer 64 to create an array consisting of a bidirectional list of wireless customer premises unit control tables. Specifically, regarding downlink traffic data, for the wireless customer premises unit control tables provided for a certain customer premises unit, the downlink next pointer 63 indicates the wireless customer premises unit control table corresponding to the customer premises unit next in order, while the downlink prev pointer 64 indicates the wireless customer premises unit control table corresponding to the customer premises unit previous in order.

When the base station unit B of this example allocates wireless bandwidth for performing uplink communications and downlink communications with respect to the customer premises units C1-C3, wireless bandwidth is allocated according to the sequence of the aforementioned array created regarding uplink traffic data and downlink traffic data, starting from the customer premises unit indicated in the wireless customer premises unit control table at the top of the array, in order.

The wireless customer premises unit ID 65 is set to the identifier allocated to the customer premises units C1-C3 that perform communication within the service area of the base station unit B.

The unit class 66 is set to the class to which the customer premises units C1-C3 managed by the wireless customer premises unit ID 65 belongs. Note that the class will be described in detail in Preferred Embodiment 2 of the present invention, as described later.

Regarding uplink traffic data, the uplink data queue counter 67 is set to the number of units of data (data queuing count (traffic)) in the state in which the sending of data is delayed by the customer premises units C1-C3 managed by the wireless customer premises unit ID 65.

Similarly, regarding downlink traffic data, the downlink data queue counter 68 is set to the number of units of data (data queuing count (traffic)) in the state in which the base station unit B delays the sending of data to the customer premises units C1-C3 managed by the wireless customer premises unit ID 65.

Note that in this example, when the number of units of data set as the content of the aforementioned uplink data queue counter 67 and content of the downlink data queue counter 68 are counted, the data sent in one packet (in this example, one slot of the data traffic channel) is counted as one unit of data, or namely, the units of data are counted by taking the data sent in one packet as one unit of data.

In addition, in this example, regarding downlink traffic data, the base station unit B counts up the data queuing count based on the situation of occurrence of data destined for the customer terminal units T1-T3, T11-T13 and T21-T23 received via the backbone network N (data sent to the customer premises units C1-C3). On the other hand, regarding uplink traffic data, the base station unit B counts up the data queuing count based on the situation of occurrence of data communication requests received from the customer premises units C1-C3.

The base station unit B of this example uses a mode wherein the wireless customer premises unit control table 11a is used to manage information regarding customer premises units C1-C3 wherein the value of the uplink data queue counter 67 and the value of the downlink data queue counter 68 are not both zero (=0), but information regarding customer premises units C1-C3 wherein both of these values are zero are not managed in wireless customer premises unit control table 11a. The addition and deletion of information regarding the customer premises units C1-C3 to the array of wireless customer premises unit control table 11a is controlled and by scheduling the allocation of wireless bandwidth to the customer premises units C1-C3, "best effort" type communications are achieved by sharing the wireless bandwidth among a plurality of customer premises units C1-C3.

FIG. 5 shows another example of the format of the wireless customer premises unit control table 11b stored in the storage block 1 of the base station unit B.

Here, the wireless customer premises unit control table 11b shown in the figure consists of, starting from the beginning: the same constituent parts 61-68 as in wireless customer premises unit control table 11a in the aforementioned FIG. 4, along with an uplink bandwidth allocation upper limit 71, uplink bandwidth allocation cumulative value 72, downlink bandwidth allocation upper limit 73 and downlink bandwidth allocation cumulative value 74.

The uplink bandwidth allocation upper limit 71 is set to the upper limit of the wireless bandwidth that can be allocated and used in uplink data communication for each of the customer premises units C1-C3.

The uplink bandwidth allocation cumulative value 72 is set to the cumulative value of the wireless bandwidth that can be allocated and used in uplink data communication for each of the customer premises units C1-C3.

The downlink bandwidth allocation upper limit 73 is set to the upper limit of the wireless bandwidth that can be allocated and used in downlink data communication for each of the customer premises units C1-C3.

The downlink bandwidth allocation cumulative value 74 is set to the cumulative value of the wireless bandwidth that can be allocated and used in downlink data communication for each of the customer premises units C1-C3.

Moreover, in order to control the allocation of data traffic channels to the customer premises units C1-C3, in uplink communication, the base station unit B compares the value of the uplink bandwidth allocation upper limit 71 and uplink bandwidth allocation cumulative value 72 for each of the customer premises units C1-C3, and in downlink communication, the base station unit B compares the value of the downlink bandwidth allocation upper limit 73 and downlink bandwidth allocation cumulative value 74 for each of the customer premises units C1-C3, and thus controls allocation.

In reference to FIG. 6, we shall present an example of the procedure for the process of the control block 2 of the base station unit B controlling the bidirectional list (bandwidth sharing wait array) of wireless customer premises unit control tables 11.

Note that this figure shows an example of the flow of processing wherein, in order to achieve "best effort" type communications that share the wireless bandwidth, the control block 2 of the base station unit B controls the addition and deletion of information regarding the customer premises units C1-C3 to the array of the wireless customer premises unit control table 11 and shares the wireless bandwidth among a plurality of customer premises units C1-C3.

In addition, here follows a description of the processing of uplink communication, but the processing of downlink communication is fundamentally similar to the processing of uplink communication. In the following, the processing of downlink communication is indicated in the form "(or, . . . )," so if the "uplink . . . " portion within the explanation is replaced with "downlink . . . " within the "(or, . . . )," then the processing of downlink communication is achieved.

In addition, in order to simplify the description in the following, the case of managing only the uplink data queue counter 67 (or, downlink data queue counter 68) is illustrated, but it is also possible to manage both the uplink data queue counter 67 and downlink data queue counter 68 together.

Based on the bidirectional list of wireless customer premises unit control tables 11, the control block 2 of the base station unit B first gets the wireless customer premises unit control table 11 at the beginning, allocates wireless bandwidth for communicating uplink traffic data (or, downlink traffic data) with the customer premises units C1-C3 managed by the wireless customer premises unit control table 11 in question (Step S1), and updates the value of the uplink data queue counter 67 (or, downlink data queue counter 68) stored in the wireless customer premises unit control table 11 in question so that it is decremented by 1 (Step S2).

Next, the control block 2 of the base station unit B determines whether or not the updated uplink data queue counter 67 (or, downlink data queue counter 68) has become zero (Step S3).

As a result of this determination (Step S3), if the updated uplink data queue counter 67 (or, downlink data queue counter 68) is determined to have become zero, the control block 2 of the base station unit B assumes that it is no longer necessary to allocate wireless bandwidth for uplink communication (or, downlink communication) with respect to the customer premises units C1-C3 managed by the wireless customer premises unit control table 11 in question, so the wireless customer premises unit control table 11 in question is deleted from the bidirectional list (bandwidth sharing wait array) of wireless customer premises unit control tables 11 (Step S4). As the next wireless customer premises unit control table 11 after the deleted wireless customer premises unit control table 11, the one pointed to by the uplink next pointer 61 (or, downlink next pointer 63) is updated to being the top wireless customer premises unit control table 11 within the bandwidth sharing wait array (Step S5).

On the other hand, as a result of the aforementioned determination (Step S3), if the updated uplink data queue counter 67 (or, downlink data queue counter 68) is determined to be 1 or greater, the control block 2 of the base station unit B takes the next wireless customer premises unit control table 11 after the wireless customer premises unit control table 11 in question, the one pointed to by the uplink next pointer 61 (or, downlink next pointer 63) and updates it to be the top wireless customer premises unit control table 11 within the bandwidth sharing wait array (Step S5).

Note that in this example, the list length of the bidirectional list (bandwidth sharing wait array) of wireless customer premises unit control tables 11 indicates the number of the customer premises units C1-C3 that share the wireless bandwidth allocated to uplink communication (or, downlink communication) of the base station unit B, and the longer this list length is, the smaller the wireless bandwidth that can be allocated to any one of the customer premises units C1-C3 becomes when evenly allocating the wireless bandwidth to each of the customer premises units C1-C3.

In reference to FIG. 7, we shall present an example of the procedure for the process of the control block 2 of the base station unit B performing flow control regarding the bandwidth allocation of data traffic channels for each of the customer premises units C1-C3. Note that the process shown in the figure is executed after the processing of the step "Get the top wireless customer premises unit control table (Step S1)" within the process illustrated in FIG. 6 above.

In addition, here follows a description of the processing of uplink communication, but the processing of downlink communication is fundamentally similar to the processing of uplink communication. In the following, the processing of downlink communication is indicated in the form "(or, . . . )," so if the "uplink . . . " portion within the explanation is replaced with "downlink . . . " within the "(or, . . . )," then the processing of downlink communication is achieved.

During the period until searching on the customer premises units C1-C3 corresponding to all of the wireless customer premises unit control tables 11 in the bandwidth sharing wait array is complete (Step S11), the control block 2 of the base station unit B performs the following processing.

To wit, the control block 2 of the base station unit B first gets the uplink bandwidth allocation upper limit 71 (or, downlink bandwidth allocation upper limit 73) and the uplink bandwidth allocation cumulative value 72 (or, downlink bandwidth allocation cumulative value 74) of the customer premises units C1-C3 subject to processing from the wireless customer premises unit control table 11 of the customer premises units C1-C3 in question (Step S12), and compares the magnitude of these two values (Step S13).

If the result of this comparison determines that the uplink bandwidth allocation cumulative value 72 (or, downlink bandwidth allocation cumulative value 74) is greater than or equal to the uplink bandwidth allocation upper limit 71 (or, downlink bandwidth allocation upper limit 73), the allocation has already reached the upper limit, so the control block 2 of the base station unit B performs flow control so that wireless bandwidth is not allocated to the customer premises units C1-C3 in question.

In addition, in this case, the control block 2 of the base station unit B looks up the pointer to the next customer premises units C1-C3 from the bandwidth sharing wait array, gets the wireless customer premises unit control table 11 of the next of the customer premises units C1-C3 in question (Step S17), returns to the aforementioned process (Step S11) and repeats the same process.

Note that if the search reaches the end of the bandwidth sharing wait array (Step S11), the control block 2 of the base station unit B ends the scheduling process related to the allocation of wireless bandwidth.

On the other hand, if the result of this comparison determines that the uplink bandwidth allocation cumulative value 72 (or, downlink bandwidth allocation cumulative value 74) is less than the uplink bandwidth allocation upper limit 71 (or, downlink bandwidth allocation upper limit 73), the allocation has not yet reached the upper limit, so the control block 2 of the base station unit B does not perform flow control, but rather performs the allocation of wireless bandwidth and increments by 1 the count of the uplink bandwidth allocation cumulative value 72 (or, downlink bandwidth allocation cumulative value 74) (Step S14).

In addition, the control block 2 of the base station unit B may measure the time and at fixed time intervals clear the uplink bandwidth allocation cumulative value 72 (or, downlink bandwidth allocation cumulative value 74) of each of the customer premises units C1-C3 to the value zero. Specifically, the control block 2 of the base station unit B determines whether or not it is the time to clear the uplink bandwidth allocation cumulative value 72 (or, downlink bandwidth allocation cumulative value 74) of each of the customer premises units C1-C3 each time a fixed period of time has elapsed (Step S15), and if it is time, clears the uplink bandwidth allocation cumulative value 72 (or, downlink bandwidth allocation cumulative value 74) of each of the customer premises units C1-C3 in question (Step S16).

By means of this flow limiting regarding the allocation of data traffic channels, when allocating data traffic channels to each of the customer premises units C1-C3, the uplink bandwidth allocation cumulative value 72 (or, downlink bandwidth allocation cumulative value 74) of each of the customer premises units C1-C3 can be constantly kept from exceeding the uplink bandwidth allocation upper limit 71 (or, downlink bandwidth allocation upper limit 73), and also, it is possible to perform flow control of the wireless bandwidth during the time intervals at which the uplink bandwidth allocation cumulative value 72 (or, downlink bandwidth allocation cumulative value 74) is cleared, so the flow of the wireless bandwidth that can be used by the customer premises units C1-C3 can be limited to a fixed quantity or a nearly fixed quantity.

As described above, with the wireless access system of this example, in a configuration consisting of a plurality of base station units B and a plurality of customer premises units C1-C3 connected to customer terminal units T1-T3, T11-T13 and T21-T23, where wireless communication is performed between the base station units B and customer premises units C1-C3, the allocation of data traffic channels (in this example, the downlink data traffic channel 53 and the uplink/downlink data traffic channel 54) can be scheduled for each data queue (traffic), and thus a "best effort" type communication function for sharing the wireless bandwidth among a plurality of customer premises units C1-C3 can be achieved.

In addition, with the wireless access system of this example, in the case that a "best effort" type communication function for sharing the wireless bandwidth among a plurality of customer premises units C1-C3 is used, by performing flow control of the allocation of data traffic channels for each of the customer premises units C1-C3 (namely, for each flow), it is possible to assure the wireless bandwidth for each of the customer premises units C1-C3, and also the wireless bandwidth assured among the customer premises units C1-C3 can be made different and distinguished.

Here, in this example, the downlink data traffic channel 53 contained in the wireless frame 50 is used as a data traffic channel for communicating downlink traffic data, and the uplink/downlink data traffic channel 54 contained in the wireless frame 50 is used as a data traffic channel for communicating uplink traffic data or downlink traffic data.

In addition, in this example, the data that is communicated using packets communicated by the slots of one downlink data traffic channel 53, or the data that is communicated using packets communicated by the slots of one uplink/downlink data traffic channel 54 is used as the unit of data communication.

In addition, in this example, in uplink communication and downlink communication, a communication request is generated at each unit of data communication (data queue), and also, data on communication standby is shifted to the communication process at each unit of data communication.

In addition, in this example, information managed by the wireless customer premises unit control table 11 is used as communication standby information, and because the value of the uplink data queue counter 67 and the value of the downlink data queue counter 68 are 1 or greater, the corresponding customer premises units C1-C3 are distinguished as being those on communication standby.

In addition, in this example, the slots of one downlink data traffic channel 53 contained in the wireless frame 50 and the slots of one uplink/downlink data traffic channel 54 contained in the wireless frame 50 are equivalent to the data communication slots.

In addition, in this example, on every unit of traffic data, the customer premises units C1-C3 subject to communication standby are switched one at a time in the periodic sequence set in the bidirectional list of wireless customer premises unit control tables 11, and the first empty data communications slot is allocated to the switched customer premises units C1-C3.

In addition, in this example, wireless communication of data between the customer premises units C1-C3 and base station unit B is performed using the data communication slot which is the portion of the data traffic channel allocated to customer premises units C1-C3.

In addition, in the base station unit B according to this example, the communication standby information management means constitutes a function for managing the information of the wireless customer premises unit control table 11, the data traffic channel allocation means constitutes a function for allocating data traffic channels for each unit of traffic data and a function for limiting the data traffic channels allocated to each of the customer premises units C1-C3, and the data wireless communication means constitutes a function for performing the wireless communication of data with the customer premises units C1-C3 using the allocated portions of the data traffic channels.

Here follows a description of Preferred Embodiment 2 of the present invention.

The wireless access system of this example has the same constitution as that shown in Preferred Embodiment 1 above, and has functions for performing the same operations as those illustrated in Preferred Embodiment 1 above.

In the following, we shall omit the description of the constitution and operations described in Preferred Embodiment 1 above, and describe in detail the constitution and operations characteristic to the wireless access system of this example. Note that for simplicity in description in this example, the same symbols as those presented in Preferred Embodiment 1 above are used to illustrate the base station unit B, customer premises units C1-C3 and other constituent elements.

In this example, the three Classes 1, 2 and 3 are provided to categorize the customer premises units C1-C3, and each of the customer premises units C1-C3 covered by the base station unit B is categorized into one of the Classes 1-3. In addition, the information for Classes 1-3 to which each of the customer premises units C1-C3 belong is set in the unit class 66 contained in the wireless customer premises unit control table 11 as shown in FIG. 4 or FIG. 5 above.

In addition, in this example, the wireless bandwidth allocated to the base station unit B is divided, so the customer premises units C1-C3 that perform wireless communication with the base station unit B in question are allocated to each of the plurality of categorized Classes 1-3.

FIG. 8 shows one example of the format of the bandwidth scheduling control table 12 stored in the storage block 1 of base station unit B. As shown in this figure, the bandwidth scheduling control table 12 consists of offsets 81 which indicate information consisting of sequence numbers corresponding to the frame counter reported by the wireless frame 50, along with corresponding allocation candidates 82 which indicate information consisting of the Classes 1-3 to which the data traffic channel is allocated in the wireless frame 50 corresponding to the sequence numbers in question.

Specifically, in the illustrated example, the values of the offsets 81 given as 0, 1, 2, . . . n−1 correspond to Class 1, Class 2, Class 3, . . . , Class 1, so the Classes 1-3 are allocated as the allocation candidates 82. Note that n may have a value of 2 or greater, for example.

Based on this correspondence between the offsets 81 and allocation candidates 82, the base station unit B may assure the exclusive allocation of wireless bandwidth among the Classes 1-3 in an existing frame period, for example, and achieves the function of differentiating the amount of wireless bandwidth assured among Classes 1-3, for example. Note that various periods may be used as this frame period.

FIG. 9 shows one example of the format of the class-based channel scheduling control table 12 stored in the storage block 1 of base station unit B. As shown in this figure, the class-based channel scheduling control table 13 consists of a plurality of channel scheduling tables provided in order to manage information for each of Classes 1-3. In the illustrated example, the table consists of channel scheduling table control table 90*a* for Class 1, channel scheduling table control table 90*b* for Class 2 and channel scheduling table control table 90*c* for Class 3.

As shown in the figure, the channel scheduling table control tables 90*a*-90*c* for Classes 1-3 consist of, starting from the beginning: the entry size 91, entry count 92, uplink top pointer 93 and downlink top pointer 94.

The entry size 91 is set to information that indicates the maximum number of customer premises units C1-C3 that are able to share wireless bandwidth in the corresponding Classes 1-3, or namely information that indicates the maximum number of customer premises units C1-C3 that can be categorized into these Classes 1-3.

The entry count 92 is set to information indicating the number of customer premises units C1-C3 that are currently sharing wireless bandwidth, or namely information that indicates the number of customer premises units C1-C3 that are currently categorized into these Classes 1-3.

The uplink top pointer 93 is set to a pointer that, when the bidirectional list (bandwidth sharing wait array) of wireless customer premises unit control tables 11 related to uplink communication is categorized into Classes 1-3 based on the information in the unit class 66, indicates the customer premises unit C1-C3 at the top within one or more customer premises units C1-C3 categorized into the corresponding Classes 1-3.

Similarly, the downlink top pointer 94 is set to a pointer that, when the bidirectional list (bandwidth sharing wait array) of wireless customer premises unit control tables 11 related to downlink communication is categorized into Classes 1-3 based on the information in the unit class 66, indicates the customer premises unit C1-C3 at the top within one or more customer premises units C1-C3 categorized into the corresponding Classes 1-3.

Here, the uplink top pointer 93 is used in order to perform the allocation of the uplink data traffic channel 54 in wireless frame 50 into Classes 1-3, and similarly the downlink top pointer 94 is used in order to perform the allocation of the downlink data traffic channels 53, 54 in wireless frame 50 into Classes 1-3.

In addition, in this example, depending on the information in the entry size 91 set for Classes 1-3, for those of Classes 1-3 wherein the maximum number of customer premises units C1-C3 that can be categorized is 1, the wireless bandwidth allocated to the Classes 1-3 in question from one of the customer premises units C1-C3 categorized into Classes 1-3 is made exclusive. On the other hand, for those of Classes 1-3 wherein the maximum number of customer premises units C1-C3 that can be categorized is 2 or greater, the wireless bandwidth allocated to the Classes 1-3 in question from 2 or more of the customer premises units C1-C3 categorized into Classes 1-3 is shared.

In reference to FIG. 10, we shall present one example of the procedure for the process of scheduling the bandwidth allocation of data traffic channels by Classes 1-3 by means of the control block 2 of the base station unit B.

Note that this figure shows one example of the flow of this process performed by the control block 2 of the base station unit B.

The control block 2 of the base station unit B first increments the frame counter of the wireless frame 50 by 1 and calculates the sequence number stored as the offset 81 in the bandwidth scheduling control table 12 (Step S21). Note that the sequence number may be the value of the remainder when the value of the frame counter is divided by the number of frames contained in the stipulated frame period.

Based on the information for the allocation candidate 82 stored in the bandwidth scheduling control table 12, the control block 2 of the base station unit B next identifies the Class 1-3 set as the candidate for allocation of bandwidth corresponding to the calculated sequence number and determines the identified Class 1-3 as the class to which the data traffic channel is allocated in the wireless frame 50 corresponding to the sequence number in question.

Next, after determining the Class 1-3 for which the data communication service is to be performed in wireless frame 50 as above, the control block 2 of the base station unit B identifies the customer premises unit C1-C3 managed in the top wireless customer premises unit control table 11 within the customer premises units C1-C3 categorized in Classes 1-3, and allocates the data traffic channel for the identified customer premises units C1-C3 (Step S23, Step S24, Steps S26-S28).

Specifically, the control block 2 of the base station unit B determines whether or not the identified class is "Class 1" (Step S23), and if so, gets the top wireless customer premises unit control table 11 within the wireless customer premises unit control tables 11 regarding the customer premises units C1-C3 categorized in "Class 1," and allocates the data traffic channel allocated to this "Class 1" to the customer premises units C1-C3 corresponding to the top wireless customer premises unit control table 11 thus gotten, or namely in this example, allocates the downlink data traffic channel 53 or uplink/downlink data traffic channel 54 (Step S24).

If as a result of the aforementioned determination (Step S23), the identified class is not "Class 1," then the control block 2 of the base station unit B determines whether the identified class is "Class 2" or not (Step S26), and if so, gets the top wireless customer premises unit control table 11 within the wireless customer premises unit control tables 11 regarding the customer premises units C1-C3 categorized in "Class 2," and allocates the data traffic channel allocated to this "Class 2" to the customer premises units C1-C3 corresponding to the top wireless customer premises unit control table 11 thus gotten (Step S27).

If as a result of the aforementioned determination (Step S26), the identified class is not "Class 2," then the control block 2 of the base station unit B assumes that the identified class is "Class 3," gets the top wireless customer premises unit control table 11 within the wireless customer premises unit control tables 11 regarding the customer premises units C1-C3 categorized in "Class 3," and allocates the data traffic channel allocated to this "Class 3" to the customer premises units C1-C3 corresponding to the top wireless customer premises unit control table 11 thus gotten (Step S28).

The control block 2 of the base station unit B next uses the same procedure for channel scheduling illustrated in FIG. 6 above to perform the allocation of wireless bandwidth in the identified Classes 1-3, the adding or deletion of information to the bidirectional list (bandwidth sharing wait array in the class in question) of the wireless customer premises unit control tables 11 in the identified Classes 1-3 along with other control processes (Step S25).

As described above, with the wireless access system of this example, in a configuration comprising a plurality of base station unit B and a plurality of customer premises units C1-C3 connected to customer terminal units T1-T3, T11-T13 and T21-T23 and performing wireless communication between the base station unit B and customer premises units C1-C3, the allocation of data traffic channels (in this example, the downlink data traffic channel 53 and uplink/downlink data traffic channel 54) for the customer premises units C1-C3 is scheduled for each of Classes 1-3, so exclusive wireless bandwidth can be assured for each of Classes 1-3, and it is possible to differentiate the wireless bandwidth assured among the Classes 1-3.

In addition, with the wireless access system according to this example, one or more customer premises units C1-C3 are grouped and the wireless bandwidth allocated as exclusive for Classes 1-3 is allocated to each group consisting of one or more customer premises units C1-C3, so under the control of the same base station unit B, it is possible to achieve communication on a mixture of wireless bandwidth used exclusively for one of the customer premises units C1-C3 and wireless bandwidth shared by a plurality of customer premises units C1-C3.

In addition, with the wireless access system according to this example, by performing flow control of the allocation of data traffic channels for each of the customer premises units C1-C3 (to wit, for each flow), it is possible to assure wireless bandwidth for each of the customer premises units C1-C3, and also it is possible to differentiate the wireless bandwidth assured among the customer premises units C1-C3.

Here, in this example, the wireless bandwidth allocated to the base station unit B is divided and allocated to each of Classes 1-3, and moreover, in each of Classes 1-3, the wireless bandwidth allocated to Classes 1-3 is allocated to one or more customer premises units C1-C3 categorized in that one of Classes 1-3.

In addition, in this example, Classes 1-3 are set to the maximum number of customer premises units C1-C3 that can be categorized in that one of Classes 1-3, and a number of customer premises units C1-C3 below this maximum number is categorized.

In addition, with the base station unit B according to this example, the data traffic channel allocation means constitutes a function for allocating data traffic channels to the customer premises units C1-C3 categorized in Classes 1-3 for each of Classes 1-3, and the data wireless communication means constitutes a function for performing wireless communication with the customer premises units C1-C3 using the allocation portion of the data traffic channel.

Here, the configuration of the wireless communications system, base station units, customer premises equipment or the like according to the present invention is not necessarily limited to that illustrated above, but rather various configurations may be used.

In addition, the applicable fields of the present invention are not necessarily limited to those illustrated above, but rather the present invention may be applied to various fields. As one example, where the present example illustrates the case of applying the present invention to a subscriber wireless access system in which the base station equipment and customer premises equipment are fixed, and customer terminal equipment is connected to the customer premises equipment, the present invention is also applicable to mobile communications systems and various other wireless communications systems.

In addition, the various processing performed in the wireless communications system, base station units, customer premises equipment or the like according to the present invention may be constituted by being implemented in hardware resources equipped with a processor and memory and the like, for example, being controlled by means of a processor executing a control program stored in read-only memory (ROM). In addition, the various functional means for executing this processing may also be constituted as independent hardware circuits.

In addition, the present invention may also be understood as one wherein the above control program (itself) is stored in a floppy disc®, CD-ROM or other computer-readable recording media, so that the processing according to the present invention can be implemented by loading said control program from the recording medium into a computer and executing the program by a processor.

As described above, with the wireless communications system according to the present invention, when a base station unit and a plurality of customer premises units covered by said base station unit communicate data wirelessly using data traffic channels, since the data traffic channels that can be allocated to each unit of customer premises equipment are limited and then the allocation of data traffic channels to customer premises equipment is performed, it is possible to discriminate among the customer premises equipment with respect to the wireless bandwidth to be assured, for example, and the allocation of data traffic channels dynamically depending on the communication situation and the like can be performed while limiting the allocation of data traffic channels to each unit of customer premises equipment, for example. Thus, it is possible to improve the efficiency of data communications.

In addition, with the wireless communications system according to the present invention, when a base station unit and a plurality of customer premises units covered by said base station unit communicate data wirelessly using data traffic channels, data communication between the base station unit and customer premises units is performed by putting communications on standby for each unit of traffic data for which a communications request occurs, and then shifting to communications processing for each unit of traffic data on communication standby. Also, communication standby information including information that distinguishes customer premises units on communication standby with regard to the customer premises units covered by the base station unit is managed. And based on said communication standby information, the allocation of data traffic channels to customer premises units on communication standby covered by the base station unit for each of said unit of traffic data during communication standby. Furthermore, the wireless communication of data between the base station unit and customer premises units is performed using the portion of the data traffic channels allocated to said customer premises units, so even if LAN burst traffic should occur, for example, the wireless media allocated to base station equipment can be used efficiently and thus the efficiency of communication of data can be improved.

In addition, with the wireless communications system according to the present invention, in the aforementioned configuration, wireless communication between the base station unit and customer premises units covered by said base station unit is performed by means of a plurality of sequentially communicated frames, and each frame constitutes a data traffic channel and contains data communication slots used for communication of the units of said traffic data. Said communication standby information contains information indicating the number of units of said traffic data on communication standby in the customer premises units on communication standby. In addition, as the allocation of said data traffic channels, each time one unit of said traffic data on communication standby is moved to the communication process, the customer premises units on communication standby covered by the base station unit are switched one at a time in a periodic sequence, and a data communications slot contained in the first frame in which the data communications slot is not yet allocated is allocated to the switched customer premises unit. Moreover, the wireless communication of data between the base station unit and customer premises units is performed using the data communication slot allocated to said customer premises units, so even in the event that burst traffic occurs, the data traffic channels (here, data traffic slots) can be allocated uniformly to the customer premises units on communication standby, thereby improving the efficiency of data communication.

In addition, with the wireless communications system according to the present invention, when a base station unit and a plurality of customer premises units covered by said base station unit communicate data wirelessly using data traffic channels, a plurality of classes that categorize the customer premises units is provided, data traffic channels are allocated to each class, and for every class, the allocation of data traffic channels to customer premises units categorized by class is performed within the portion of data traffic channels allocated to each class. Moreover, the wireless communication of data between the base station unit and customer premises units is performed using the portion of data traffic channels allocated to said customer premises units, so even in the case of handling burst traffic in each class, for example, this will not affect the allocation of data traffic channels in other classes, so it is possible to assure a minimal level of wireless bandwidth required for data communication in other classes, and thus it is possible to improve the efficiency of data communication.

In addition, with the wireless communications system according to the present invention, in the aforementioned configuration, the maximum number of customer premises units that can be categorized in each class is set, and a number of customer premises units equal to or less than the maximum number of customer premises units that can be categorized is categorized in each class, respectively, so it is possible to assure a sufficient portion of the data traffic channels allocated to the customer premises units categorized in each class for every class, and thus it is possible to increase the efficiency of data communication.

In addition, with the wireless communications system according to the present invention, in the aforementioned configuration, both classes in which only one customer premises unit is categorized and classes in which a plurality of customer premises units is categorized are present, so regarding the customer premises units covered by the same base station unit, for example, it is possible to assure an exclusive bandwidth for a portion of the wireless bandwidth for a specific customer premises unit while also using the remaining wireless bandwidth for a plurality of customer premises units.

What is claimed is:

1. A wireless communications method wherein a base station unit and a plurality of customer premises units covered by said base station unit communicate data wirelessly using data traffic channels, said method comprising:

performing data communication between the base station unit and customer premises units by putting communications on standby for each unit of traffic data for which a communications request occurs, and then shifting to communications processing for each unit of traffic data on communication standby;

managing communication standby information including information that distinguishes customer premises units on communication standby with regard to the customer premises units covered by the base station unit;

based on said communication standby information, allocating data traffic channels to customer premises units on communication standby covered by the base station unit for each of said unit of traffic data during communication standby; and performing wireless communication of data between the base station unit and customer premises units using the portion of the data traffic channels allocated to said customer premises units;

wherein:

wireless communication between the base station unit and customer premises units covered by said base station unit is performed by means of a plurality of sequentially communicated frames;

each frame contains data communication slots that constitute data traffic channels and are used for communication of the units of said traffic data;

said communication standby information contains information indicating the number of units of said traffic data on communication standby in the customer premises units on communication standby;

as the allocation of said data traffic channels, each time one unit of said traffic data on communication standby is moved to the communication process, the customer premises units on communication standby covered by the base station unit are switched one at a time in a periodic sequence, and a data communications slot contained in the first frame in which the data communications slot is not yet allocated is allocated to the switched customer premises unit; and the wireless communication of data between the base station unit and customer premises units is conducted using the data communication slot allocated to said customer premises units.

2. A wireless communications method wherein a base station unit and a plurality of customer premises units covered by said base station unit communicate data wirelessly using data traffic channels, said method comprising:

allocating data traffic channels to customer premises units while limiting the data traffic channels that can be allocated to each customer premises unit; and performing wireless communication of data between the base station unit and customer premises units using the portion of data traffic channels allocated to said customer premises units;

wherein:

the upper limit of the quantity of data traffic channels that can be allocated to each of the customer premises units is set, and the quantity of data traffic channels allocated to the customer premises units is limited to the upper limit or less, or less than the upper limit set for said customer premises units;

data communication between the base station unit and customer premises units is performed by putting communications on standby for each unit of traffic data for which a communications request occurs, and then shifting to communications processing for each unit of traffic data on communication standby;

an upper limit for the number of said units of traffic data for which communication is possible for each customer premises unit is set;

communication standby information including information that distinguishes customer premises units on communication standby with regard to the customer premises units covered by the base station unit is managed; and based on said communication standby information, the number of data traffic channels that can be allocated to the customer premises units is limited to the upper limit number or less, or less than the upper limit number set for said customer premises units, and data traffic channels are allocated to the customer premises units on communication standby covered by the base station unit for each of said units of traffic data during communication standby;

the number of units of said traffic data that can be communicated by each unit of the customer premises equipment is counted, this count is compared against the upper limit number set for each unit of the customer premises equipment, and based on the results of this comparison, a determination is made as to whether or not communication of said unit of traffic data by said unit of the customer premises equipment is possible; and the count for each unit of the customer premises equipment is set to zero at stipulated time intervals.

3. A base station unit that communicates wirelessly with a plurality of customer premises units using data traffic channels, wherein data communication with the customer premises units is performed by putting communications on standby for each unit of traffic data for which a communications request occurs, and then shifting to communications processing for each unit of traffic data on communication standby, the base station equipment comprising:

communication standby information management means for managing information that distinguishes customer premises units on communication standby regarding customer premises units covered by said base station unit;

data traffic channel allocation means for allocating data traffic channels to customer premises units on communication standby covered by said base station unit for each unit of traffic data during communication standby based on said communication standby information; and data wireless communication means for performing the wireless communication of data with the customer premises units using the portions of the data traffic channels allocated to said customer premises units;

wherein:

wireless communication between the base station unit and customer premises units covered by said base station unit is performed by means of a plurality of sequentially communicated frames;

each frame contains data communication slots that constitute data traffic channels and are used for communication of the units of said traffic data;

said communication standby information contains information indicating the number of units of said traffic data on communication standby in the customer premises units on communication standby;

the data traffic channel allocation means of said base station unit performs a process whereby, as the allocation of said data traffic channels, each time one unit of said traffic data on communication standby is moved to the communication process, the customer premises units on communication standby covered by the base station unit are switched one at a time in a periodic sequence, and a data communications slot contained in the first frame in which the data communications slot is not yet allocated is allocated to the switched customer premises unit; and the data wireless communication means of said base station unit performs the wireless communication of data between the base station unit and customer premises units using the data communication slot allocated to said customer premises units.

* * * * *